United States Patent
Syed

(10) Patent No.: US 9,141,462 B2
(45) Date of Patent: Sep. 22, 2015

(54) SYSTEM AND METHOD FOR ERROR REPORTING IN A NETWORK

(75) Inventor: Mahaboob Basha Syed, Bangalore Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 192 days.

(21) Appl. No.: 13/977,015

(22) PCT Filed: Feb. 24, 2011

(86) PCT No.: PCT/IN2011/000110
§ 371 (c)(1),
(2), (4) Date: Jun. 28, 2013

(87) PCT Pub. No.: WO2012/114343
PCT Pub. Date: Aug. 30, 2012

(65) Prior Publication Data
US 2013/0275820 A1    Oct. 17, 2013

(51) Int. Cl.
  *G06F 11/30*   (2006.01)
  *G06F 11/07*   (2006.01)
  *H04L 12/24*   (2006.01)

(52) U.S. Cl.
  CPC .......... *G06F 11/0772* (2013.01); *H04L 41/064* (2013.01); *H04L 41/065* (2013.01)

(58) Field of Classification Search
  CPC ........................ G06F 11/0766; G06F 11/3075
  USPC ........................................................... 714/48
  See application file for complete search history.

(56) References Cited

U.S. PATENT DOCUMENTS

| | | | |
|---|---|---|---|
| 7,263,553 B2 * | 8/2007 | Gaspard | 709/224 |
| 7,730,537 B2 | 6/2010 | Bardsley et al. | |
| 2003/0235153 A1 * | 12/2003 | Lee et al. | 370/229 |
| 2004/0139368 A1 | 7/2004 | Austen et al. | |
| 2005/0193285 A1 | 9/2005 | Jeon | |
| 2005/0198281 A1 * | 9/2005 | Wang et al. | 709/224 |
| 2007/0140146 A1 | 6/2007 | Liu et al. | |
| 2009/0199053 A1 * | 8/2009 | Neilan et al. | 714/57 |
| 2011/0072369 A1 * | 3/2011 | Choi et al. | 715/760 |
| 2011/0131316 A1 * | 6/2011 | Ferris et al. | 709/224 |
| 2013/0311545 A1 * | 11/2013 | Wright et al. | 709/202 |
| 2013/0339375 A1 * | 12/2013 | Adayikkoth | 707/754 |

FOREIGN PATENT DOCUMENTS

| | | |
|---|---|---|
| CN | 1655517 | 8/2005 |
| CN | 1859171 | 11/2006 |
| CN | 101102217 A | 1/2008 |

(Continued)

OTHER PUBLICATIONS

"Network Monitoring Software", Luteus Sarl; http://www.loriotpro.com/ServiceAndSupport/How_to/ForwardWINEvent_EN.php.

(Continued)

*Primary Examiner* — Chae Ko
(74) *Attorney, Agent, or Firm* — Hewlett-Packard Patent Department

(57) ABSTRACT

A system is provided for managing error reporting in a network. The system comprises a buffer for storing traps, a timer that measures a time period and a buffer manager that compares incoming traps to traps already stored in the buffer. An incoming trap is stored in the buffer if it is determined that the incoming trap is not similar to traps already stored in the buffer. The buffer is cleared after the time period measured by the timer has elapsed.

15 Claims, 3 Drawing Sheets

(56) References Cited

FOREIGN PATENT DOCUMENTS

| | | |
|---|---|---|
| CN | 101158918 | 4/2008 |
| CN | 101247254 | 8/2008 |
| EP | 1785866 | 5/2007 |
| KR | 2006-0127446 | 12/2006 |
| WO | PCT2002/047330 | 6/2002 |

OTHER PUBLICATIONS

International Search Report and Written Opinion dated Dec. 1, 2011 issued on PCT Patent Application No. PCT/IN2011/000110 filed on Feb. 24, 2011, SIPO.

PCT/IN2011/000110 International Preliminary Report on Patentability, 6 pages.

* cited by examiner

| 301 TRAP ID | 302 TRAP TYPE | 303 TRAP COUNT | 304 FURTHER INFO | 305 TRAP DATA |
|---|---|---|---|---|

| 401 EVENT ID | 402 TIME RECEIVED | 403 FURTHER INFORMATION |
|---|---|---|

| 401 EVENT ID | 402 TIME RECEIVED | 403 TRAP COUNT | 404 END TIME | 405 FURTHER INFO | 406 EVENT RESOLVED? |
|---|---|---|---|---|---|

SYSTEM AND METHOD FOR ERROR REPORTING IN A NETWORK

CROSS-REFERENCE TO RELATED APPLICATION

The present application is a 371 application of International Application No. PCT/IN2011/000110 filed on Feb. 24, 2011 and entitled "System and Method for Error Reporting in a Network."

BACKGROUND OF THE INVENTION

In recent years it has become common to connect computers and other devices via a network. The network facilitates communication of information and sharing of resources. For example, networks include, but are not limited to, Local Area Networks (LAN), Wide Area Networks (WAN) and Wireless Local Area Networks (WLAN). Conventionally networks are managed by a Network Management System (NMS), which may be provided on a server. In a typical arrangement when a network element experiences a fault it sends a 'trap' reporting the problem to the NMS. The NMS unpacks and processes the received traps and logs each of them as an event. The NMS analyses the events and generates alarms in respect of the events which it deems critical. The alarms are notified to the network administrator, e.g. via a display on the NMS or sending a notification to the network administrator's computer.

As networks become larger and contain an ever increasing number of network elements (computers and other devices connected to the network), the number of traps sent to the NMS increase.

BRIEF DESCRIPTION OF THE DRAWINGS

Some examples are described in the following figures.

DETAILED DESCRIPTION

Figure 1:
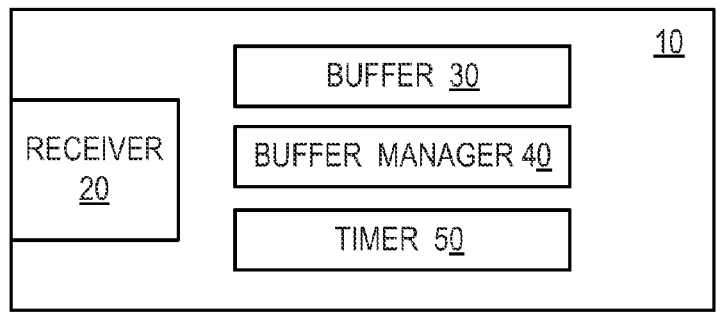
FIG. 1 is one example of a system for managing error reporting in a network.
Figure 2:
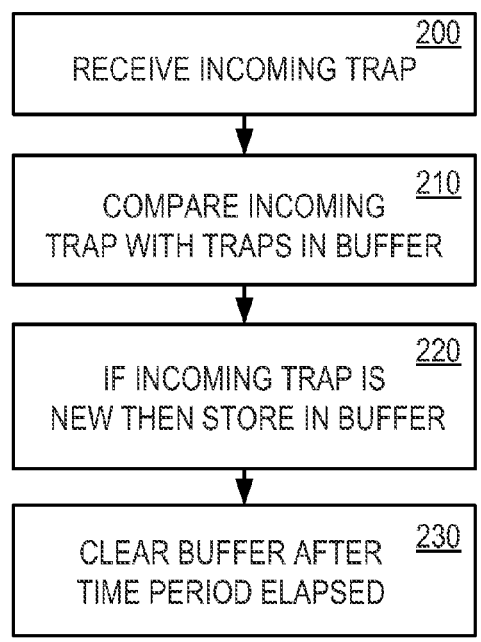
FIG. 2 is one example of a method for managing error reporting in a network

FIG. 1 shows an example of a network management system 10 for reporting errors in a network. The network management system 10 comprises a receiver 20, such as a port, for receiving traps sent by network elements; a buffer 30 for storing traps, a buffer manager 40 and a timer 50. The network management system 10 operates as shown in the flow diagram of FIG. 2. At 200 the receiver 20 receives a trap sent from a network element in the network. At 210 the buffer manager compares the received trap to any traps already stored in the buffer 40. If the buffer manager determines that the received trap is not similar to a trap already stored in the buffer 30, then the received trap is stored as a new entry in the buffer (220). Meanwhile the timer 50 counts a time period, which may be preset or determined by the network manager. At the end of the time period counted by the counter, some or all traps stored in the buffer 30 may be forwarded for processing as events and the buffer is cleared (230). In this way processing power is saved and bottlenecks may be avoided, as only traps saved in the buffer are forwarded for processing. Identical and similar traps may be discarded without saving in the buffer or processing as an event.

In this specification the term 'similar' includes both traps which are similar and traps which are identical. The buffer manager may compare traps to determine if they are similar, by comparing identifying information of the traps, such as a trap ID or the address of the network element from which the trap originated. In one example the buffer manager compares traps by comparing the trap types (e.g. the type of error or incident to which the trap relates).

Figures 3, 5, 6, 7:
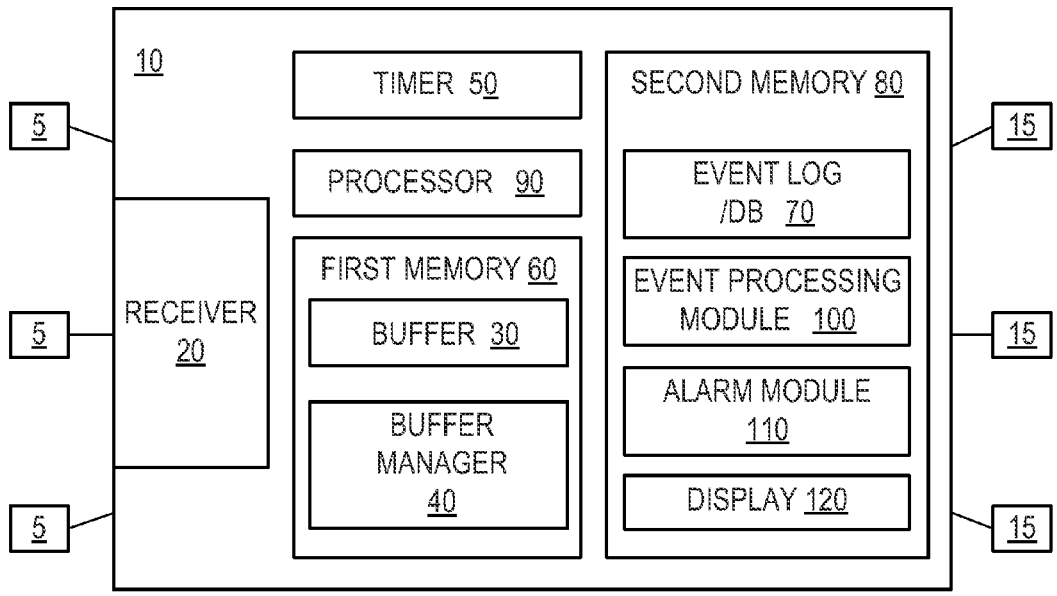
FIG. 3 is one example of a network and a network management system for managing error reporting in the network.
FIG. 5 is a data structure diagram showing one example of a buffer entry.
FIG. 6 is a data structure diagram showing one example of an event log entry.
FIG. 7 is data structure diagram showing another example of an event log entry.

FIG. 3 shows an example of a network 1 containing a network management system (NMS) 10, a plurality of network elements 5 and a plurality of client terminals 15 connected to the network management system. The network elements 5 may for example include personal computers, servers, printers, routers, storage devices etc. The client terminals 15 may be computers which one or more network administrators use to manage the network (via the NMS).

The NMS 10 may be provided on server. The NMS comprises a receiver 20 for receiving traps, which is the same as that described above in FIG. 1. The NMS further comprises a processor 90, a first memory 60 and a second memory 80. There is also a timer 50 for counting a time period in the same manner as described above in the example of FIGS. 1 and 2. In the illustrated example the timer 50 is separate from the processor 90, but in other examples the timer 50 could be provided as a function of the processor 90.

The first memory 60 comprises a buffer 30 for storing traps and a buffer manager module 40 for managing the buffer 30. The buffer manager module may comprise a set of computer operable instructions which may be implemented by the processor 90. The second memory 80 stores an event storage log or database 70 for storing details of processed events, an event processing module 100 for processing traps into events and an alarm module 110 for generating an alarm when an event or events meet certain criteria. The event processing module and the alarm module may comprise sets of computer operable instructions which may be implemented by the processor 90. The NMS may also comprise a display 120. In the illustrated example there are two memories: a first memory 60 and a second memory 80, but in other examples there may be one memory which is divided into two regions or sections or there may be more than two memories.

An example of the operation of the NMS and in particular the buffer manager module 40 will now be described with reference to the flow diagram of FIG. 4. At 190 the timer 50 starts to count a time period. At 200 the receiver 20 receives a trap sent by a network element. At 210 the buffer manager 40 compares the received trap with traps already stored in the buffer 30. If the buffer manager judges the received trap to be similar to a trap already stored in the buffer 30, then the entry in the buffer corresponding to the similar trap is updated (215). For example the buffer entry may be updated to indicate the number of similar traps received so far in the time period counted by the timer. Further information relating to the most recently received similar trap may also be added to the buffer entry. If on the other hand the buffer manager 40 judges that the received trap is not similar to any of the traps already stored in the buffer (during the current time period counted by the timer), then the received trap is stored as a new entry in the buffer at 220. Further, as the trap is a new or 'unique' trap which is not similar to or identical to a trap received earlier in the time period, it is forwarded for processing 240 by the event processing module 100. In one example the new trap is forwarded for processing immediately or as soon as possible; in another example there may be a short delay, but in any case the trap is forwarded for processing before the end of the time period counted by the timer 50. In this way new traps are forwarded quickly and may be processed promptly, rather than waiting for the end of the time period counted by the timer 50. This facilitates smooth running of the network and may prevent a failure as serious problems can be addressed promptly before they escalate. However, subsequent traps received in the time period which are similar to a trap already stored in the buffer are not forwarded for event processing at this stage. Thus, the event processing module 100 and processor 90 are not overwhelmed by a flood or storm of traps, because only unique traps are forwarded for processing at 240 before the end of the time period counted by the timer.

An example of an entry in the buffer 30 is shown in FIG. 5. The entry comprises a trap ID 301, a trap type 302 indicating the type of event, a trap count 303 relating to the number of similar traps which have been received in the time period. In one example the trap count is 0 if the trap is the first trap of its kind stored in the buffer in the time period (i.e. if it is stored as a new trap at 220). Subsequently the trap count is incremented by 1 each time a similar trap is received in the same time period and identified by the buffer manager at 215. This is just by way of example and in other arrangements the first trap may have a count of 1 and be updated to 2 on receipt of the second similar or identical trap etc. The buffer entry may contain further information 304. The further information 304 may relate to a parameter of the trap, for instance the temperature of the network element which generated the trap, number of packets dropped by a port of the network element (in case of congestion), number packets received by the port of the network element, number of packets sent from the network element port, information stored in the VARBIND of the incoming trap etc. The buffer entry also stores the data or selected data 305 from the received trap, for instance a simple copy of part, or all, of the trap. If the buffer entry is updated when a similar trap is received, the further information 304 and trap data 305 may be partially or fully overwritten with data relating to the most recently received trap.

In one example the trap type 302 is a "topology change count". This type of trap is generated by the network element when a port of the network element flaps frequently (i.e. repeatedly goes up/down). In this case the trap might carry information relating to traffic flowing from the port, such as the in/out rate, drop rate etc. The in/out rate, drop rate etc may be recorded in the further info and/or trap data fields 304 and 305 of the buffer entry.

Figure 4:
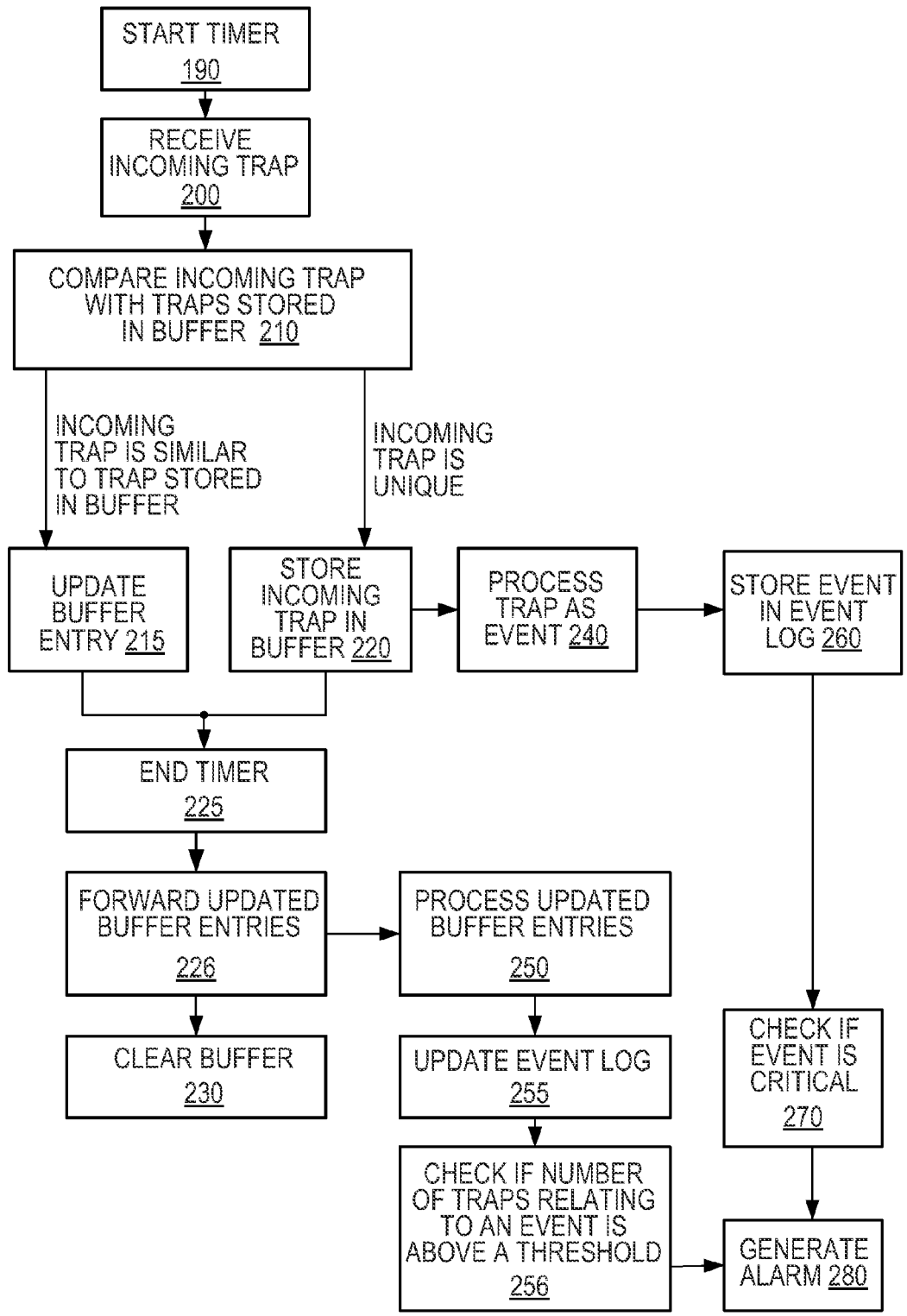
FIG. 4 is a further example of a method for managing error reporting in a network.

Steps 200 to 240 of FIG. 4 are repeated as appropriate whenever a trap is received by the receiver 20. At the end of the time period counted by the timer (225), any buffer entries for which more than one similar trap has been received in the time period (i.e. buffer entries which have been updated at 215), are forwarded (225) for further processing (250) by the event processing module 210. This enables the updated trap count, further information and trap data to be included in the event log/database. The buffer 30 is then cleared and the process reverts to 190 and the timer is re-started.

Operation of the event processing module 100 will now be described. When the event processing module 100 receives a trap (at 240 in FIG. 4), it processes the trap as an event. For example, the trap may be unpacked and its contents analyzed. Once the trap has been processed to generate an event, the event processor 100 stores the event in the event log 70. An example of an entry in the event log is shown in FIG. 6. In this example the event log entry comprises an event ID 401, a time at which the event was generated 402 and further information 405 relating to the event, such as the type of event and/or other event parameters. An entry is stored (260) in the event log 70 when a unique trap is processed as an event (240) during the time period counted by the timer.

At 250 of FIG. 4, the event processing module 100 receives updated buffer entries at the end of the time period (where several similar traps have been received by the buffer). The event processing module processes the updated buffer entries and updates the event log 70 accordingly (see 255 of FIG. 4). In one example the original buffer entry may be processed and stored as a first event and the updated buffer entry processed and stored as a second event in the event log. This has the advantage that when many traps are received in a time period, the information is consolidated such that there are relatively few entries in the event log. This saves spaces and makes it easier for the system administrator to inspect and comprehend. Although not shown in the example of FIG. 6, in another implementation the second event entry may indicate the number of similar traps relating to the event.

In another example, the initial trap may be processed as a first event and at the end of the time period the updated buffer entry may be processed and stored as an update to the first event. In this case only one event is stored in the event log for each set of similar traps received in the time period. This has the advantage that even fewer events are stored in the event log.

A further example, of a more complicated event log, is shown in FIG. 7. In addition to fields 401, 402 and 405 described above, the event log in FIG. 7 further comprises a trap count 403 relating to the number of similar traps received in the time period and an end time 404 relating to the time at which the last similar trap was processed. The entry is set up when the first trap is received and processed as an event (240). The entry is then updated when the information relating to subsequent similar traps is processed at the end of the time period.

After a trap has been processed as an event by the event processing module 100, the alarm module 110 checks if the event is a critical event at 270. For example the event alarm module 110 checks if the event meets certain criteria which classify the event as critical. Such criteria may include the event type and/or parameters of the event (e.g. the temperature of the network element which generated the event). If the event is a critical event then an alarm is generated (280) to notify the system administrator. In one example the alarm may be an audible signal, an indication on the display 120 of the NMS and/or a message sent to a client terminal 15 of the system administrator. Further, when the updated buffer entries are processed, the alarm module 110 may check the trap count of that event (see 256 of FIG. 4). If the alarm module determines that the number of similar traps received in the time period exceeds a certain threshold then an alarm is generated, even if the event would not otherwise be classified as a critical event.

The above described system may be further enhanced by application of dynamic management of the buffer. For example, imagine that the time period counted by the timer is five minutes and after the first minute 100 identical traps have been received and the first trap has been processed as an event which generates an alarm. The system administrator may note the alarm and resolve the underlying problem in the third minute. However, as only the first trap has been processed as an event, without dynamic management the updated contents of the buffer (e.g. the trap count of 99 and any further related information) may be forwarded for processing as an event at the end of the five minute period, which may generate a second alarm, even though the underlying problem has already been resolved. To minimize the risk of this happening, the buffer may be dynamically managed. Examples are given below.

Figure 8:
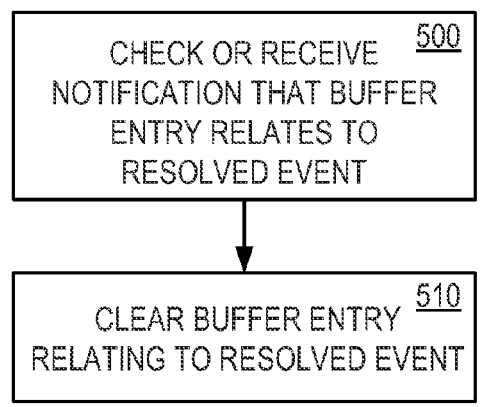
FIG. 8 is a flowchart of one example of a method for removing traps relating to resolved events from the buffer.

The event log may further comprise information indicating whether or not the event has been resolved. This information is shown as field 406 in FIG. 7, but could also be incorporated in the data structure and system of FIG. 6. This facilitates dynamic management of the NMS. In another example, information indicating that the event has been resolved may be stored in another memory of the NMS or in a storage external to the NMS. In any case this information may be used to dynamically manage the buffer 30. An example method is shown in the flowchart of FIG. 8.

At 500 the buffer manager 40 polls the event log 70 or other storage to determine if any of the buffer entries relate to an event which has already been resolved. Alternatively the buffer manager may be proactively notified by the event log or other storage when an event is resolved. In either case, at 510 the buffer entry relating to the resolved event is cleared (deleted). Thus when the time period counted by the timer is finished entries relating to already resolved events are not forwarded for further processing. In another example a buffer entry relating to the resolved event may be prevented from being forwarded to the event processor by marking the buffer entry with a flag to prevent forwarding of the buffer entry at the end of the timer period. In another example, if it is determined that the buffer entry relates to a resolved event, then the count field may be re-set to indicate that only one trap has been received in the timer period (so that the buffer manager will not forward the entry for further processing at the end of the time period, unless a subsequent trap is received after the count field has been re-set).

In a further example a non-transitory carrier carrying computer-implementable instructions is provided that, when interpreted by a computer, causes the computer to perform a method in accordance with any of the above-described examples.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless explicitly stated otherwise, each feature disclosed is one example only of a generic series of equivalent or similar features.

What is claimed is:

1. A method of managing error reporting in a network comprising:
   a. receiving incoming traps at a network management system on a server; the server having a processor and a buffer for storing traps;
   b. comparing incoming traps with traps already stored in the buffer
   c. if an incoming trap is judged to be different from traps already stored in the buffer, storing the trap as a new entry in the buffer; and
   d. clearing the buffer after a time period counted by a timer.

2. The method of claim 1 wherein if the incoming trap is judged not to be similar to traps already stored in the buffer, the incoming trap is stored in the buffer and forwarded for processing as an event before the end of the time period counted by the timer.

3. The method of claim 1 wherein if the incoming trap is judged to be similar to a trap already stored in the buffer, the buffer entry relating to the trap already stored in the buffer is updated to include information relating to the number of similar traps received within the time period counted by the timer.

4. The method of claim 1 wherein if the incoming trap is judged to be similar to a trap already stored in the buffer, the buffer entry relating to the trap already stored in the buffer is updated to include information relating to the incoming trap.

5. The method of claim 3 wherein at the end of the time period counted by the timer, updated buffer entries are forwarded for further processing.

6. The method of claim 5 wherein if the network management system determines or is informed that the event relating to an entry in the buffer has been resolved, then the buffer entry is not forwarded for further processing at the end of the time period counted by the timer.

7. The method of claim 5 wherein processed events are stored in an event log and wherein only one entry is stored in the event log for each set of similar traps received in the time period counted by the timer.

8. The method of claim 2 wherein an alarm is generated if the processed event is determined to be a critical event.

9. The method of claim 3 wherein an alarm is generated if the number of similar traps received by the network management system exceeds a threshold.

10. The method of claim 1 wherein comparing an incoming trap with traps stored in the buffer to determine if they are similar comprises comparing identifying information of the traps.

11. The method of claim 1 wherein comparing an incoming trap with traps stored in the buffer to determine if they are similar comprises comparing the trap types.

12. A system for managing error reporting in a network, the system comprising a buffer for storing traps; a timer that measures a time period and a buffer manager that compares incoming traps to traps already stored in the buffer and stores the incoming trap in the buffer if it determines that the incoming trap is not similar to traps already stored in the buffer and clears the buffer after the time period measured by the timer has elapsed.

13. The system of claim 12 wherein if the buffer manager determines that the incoming trap is not similar to traps already stored in the buffer, the incoming trap is stored in the buffer and forwarded for processing as an event before the end of the time period measured by the timer.

14. The system of claim 12 wherein if the buffer manager determines that the incoming trap is similar to a trap already stored in the buffer, the buffer entry relating to the similar trap is updated to include information relating to the incoming trap and/or information relating to the number of similar traps received in the time period measured by the timer.

15. The system of claim 14 wherein at the end of the time period measured by the timer, the buffer manager forwards updated buffer entries for further processing.

* * * * *

UNITED STATES PATENT AND TRADEMARK OFFICE
CERTIFICATE OF CORRECTION

| | | |
|---|---|---|
| PATENT NO. | : 9,141,462 B2 | Page 1 of 1 |
| APPLICATION NO. | : 13/977015 | |
| DATED | : September 22, 2015 | |
| INVENTOR(S) | : Mahaboob Basha Syed | |

It is certified that error appears in the above-identified patent and that said Letters Patent is hereby corrected as shown below:

IN THE CLAIMS

In column 5, line 64 approx., in Claim 1, delete "buffer" and insert -- buffer; --, therefor.

Signed and Sealed this
First Day of March, 2016

Michelle K. Lee
*Director of the United States Patent and Trademark Office*